United States Patent
Faler et al.

(10) Patent No.: US 9,856,862 B2
(45) Date of Patent: Jan. 2, 2018

(54) HYBRID ELECTRIC PROPULSION FOR SPACECRAFT

(71) Applicant: Wesley Gordon Faler, Dunedin, FL (US)

(72) Inventors: Wesley Gordon Faler, Dunedin, FL (US); Donald Roy Smith, Saline, MI (US)

(*) Notice: Subject to any disclaimer, the term of this patent is extended or adjusted under 35 U.S.C. 154(b) by 901 days.

(21) Appl. No.: 14/209,249

(22) Filed: Mar. 13, 2014

(65) Prior Publication Data

US 2014/0305096 A1    Oct. 16, 2014

Related U.S. Application Data

(60) Provisional application No. 61/779,378, filed on Mar. 13, 2013.

(51) Int. Cl.
| | |
|---|---|
| *F03H 1/00* | (2006.01) |
| *B64G 1/40* | (2006.01) |
| *H01J 27/24* | (2006.01) |
| *F03H 3/00* | (2006.01) |

(52) U.S. Cl.
CPC .......... *F03H 1/0087* (2013.01); *B64G 1/405* (2013.01); *F03H 3/00* (2013.01); *H01J 27/24* (2013.01)

(58) Field of Classification Search
CPC ........ F03H 3/00; F03H 1/0043; F03H 1/0056; F03H 1/005; F03H 1/0031; F03H 1/0062; F03H 1/0081; F03H 1/0087; F03H 1/0093; F03H 99/00
See application file for complete search history.

(56) References Cited

U.S. PATENT DOCUMENTS

| | | | | |
|---|---|---|---|---|
| 3,304,718 | A * | 2/1967 | Webb | F03H 1/0043 313/361.1 |
| 3,537,266 | A * | 11/1970 | Magnuson | F03H 1/0043 313/362.1 |
| 4,570,103 | A * | 2/1986 | Schoen | H05H 9/00 315/4 |
| 6,317,443 | B1 * | 11/2001 | Craig | H01S 3/094003 372/38.04 |
| 2008/0271430 | A1 * | 11/2008 | Chabert | F03H 1/0025 60/202 |

OTHER PUBLICATIONS

Williams "Propulsion Using Laser Driven Pondermotive Field for Deep Space Missions", 2009.*

* cited by examiner

*Primary Examiner* — Gerald L Sung
*Assistant Examiner* — William Breazeal
(74) *Attorney, Agent, or Firm* — Long Technology Law, LLC; Joseph L. Long

(57) ABSTRACT

A propulsion system for spacecraft is based on an electric engine that expels propellant to achieve thrust. The propellant is first ionized to generate a plasma. Plasma particles are selectively accelerated via a pulsed laser that accelerates predominantly the electrons in the plasma. The electrons are expelled first, forming a space charge that acts as a virtual cathode to accelerate the positive ions. Interactions between the laser beam and plasma electrons are predominantly through the ponderomotive force.

16 Claims, 9 Drawing Sheets

Plasma containment vessel 110

Hybrid electric spacecraft engine 100 with plasma cloud inside

Hybrid electric spacecraft engine 100 with laser light illuminating the plasma cloud Hybrid electric spacecraft engine 100 with electrons escaping Hybrid electric spacecraft engine 100 with electrons and ions escaping Method 700 for generating spacecraft thrust Possible particle paths in hybrid engine 100

Electric potential along path A-B-C

Electric potential along path D-E-F

HYBRID ELECTRIC PROPULSION FOR SPACECRAFT

CROSS REFERENCE TO RELATED APPLICATIONS

The underlying concepts, but not necessarily the language, of the following provisional application are incorporated by reference: U.S. provisional application No. 61/779, 378. If there are any contradictions or inconsistencies in language between the present application and one or more of the applications that have been incorporated by reference that might affect the interpretation of the claims in the present application, the claims in the present application should be interpreted based on the language in the present application.

This case claims benefit of the following provisional application: U.S. provisional application No. 61/779,378.

FIELD OF THE INVENTION

The present invention relates to electric spacecraft propulsion in general, and, more particularly, to ion engines and plasma engines.

BACKGROUND OF THE INVENTION

Electric propulsion for spacecraft is highly desirable for a variety of reasons, and, through the years, many designs for electric engines for spacecraft have been proposed and implemented. Two important categories of electric spacecraft engines are the ion engines and the plasma engines.

Before the advent of electric spacecraft engines, chemical rockets were the only technology available for spacecraft propulsion, and, the early decades of space exploration were based almost entirely on chemical rockets. An important difference between chemical rockets and electric engines is that, with chemical rockets, fuel and propellant are one and the same, but not so with electric propulsion. In this disclosure, the term "fuel" is used exclusively to refer to the source of energy for a propulsion system, while the term "propellant" is used exclusively to refer to the mass that is expelled by a propulsion system.

Most spacecraft propulsion systems accomplish their task by exploiting the principle of conservation of momentum. In accordance with that principle, if a mass is expelled by a spacecraft, there will be a force acting on the spacecraft while the mass is being expelled. Such force is referred to as "thrust" and is in proportion to the amount of mass that is expelled and in proportion to the velocity at which the mass is expelled. The higher the rate at which mass is expelled, the higher the thrust. Similarly, the faster the velocity of expulsion of the mass, the higher the thrust.

From the principle of conservation of momentum, as described in the previous paragraph, it might seem that a high velocity of expulsion is desirable because it yields higher thrust with less mass being expelled. However, the higher velocity comes at the cost of higher energy. In particular, calculations show that the power that must be expended to achieve a certain amount of thrust increases in proportion to the velocity of expulsion.

In spacecraft design, reducing the amount of propellant that needs to be carried is highly desirable. Such a reduction can be achieved by increasing the velocity of expulsion of the propellant. But reducing the amount of energy required by the spacecraft is also highly desirable, such that, in each space mission, a compromise must be struck between propellant mass and required energy. Such a compromise depends on the specific parameters of the mission and may be different in different parts of the mission. Therefore, it is advantageous to have a propulsion system wherein the velocity of expulsion of the propellant can be adjusted as needed to achieve such a compromise.

With chemical rockets, the velocity of expulsion of the propellant is limited by the amount of energy available from chemical reactions. Generally, the velocity of expulsion is much less than the optimum in most circumstances. That's why there is no benefit, with chemical rockets, in carrying propellant in addition to the chemical fuel needed for providing the chemical energy. Calculations show that best results are obtained by using the spent chemical fuel as propellant without mixing in additional propellant. That's also why the mass of a space rocket sitting on the launch pad is so much larger than what eventually makes it into orbit. Most of that mass is fuel.

Electric spacecraft engines are advantageous because fuel and propellant are separate. In particular, energy is supplied to the engine as electricity, and the fuel from which the electricity is generated can come from, for example, a nuclear reactor or a radioisotope source. Both such forms of fuel yield much more energy, per unit mass, than chemical fuels, such that there is no need to use the spent fuel as propellant. Better yet, for spacecraft that are close enough to the Sun, there is the option of generating electricity with solar panels. In such a case, the fuel is located in the Sun, and the spacecraft does not need to carry any fuel.

One potential benefit of electric engines is the opportunity to adjust the velocity of expulsion of the propellant. The feasibility of such an adjustment depends on the design of the electric engine, and some designs are better than others in that respect.

There are two major categories of electric engines known in the art: plasma engines and ion engines. With both categories, the propellant is prepared for expulsion by first ionizing it. The ionized propellant forms a plasma, which is a state of matter wherein atoms have lost one or more electrons, thereby becoming positive ions; and wherein the lost electrons remain mixed in with the ions, such that the overall mixture has no net electric charge.

Plasma engines heat the plasma by any of a variety of techniques well known in the art. As with any substance, heating a plasma means that plasma particles are accelerated, such that their kinetic energy (KE) increases. Heating implies that the resulting motion of plasma particles is random, so that different particles have different kinetic energies in accordance with a random distribution, and the direction of motion of the particles is also random with no preference for any particular direction of motion. Some of the heated plasma is then allowed to escape, forming the expelled propellant. Generally, the temperature of the plasma determines the average velocity with which the particles escape, which is the velocity of expulsion.

In contrast, with ion engines, ions and electrons in the plasma are separated via electric fields without heating the plasma. Electric fields are further used to accelerate the separated ions and electrons for expulsion. Ions and electrons are then expelled separately, and they recombine outside the spacecraft, forming the expelled propellant.

Plasma engines and ions engines have different advantages and disadvantages. With ion engines, the use of electric fields makes it possible to adjust the velocity of expulsion accurately by adjusting the electric fields that accelerate the ions and electrons. This capability maximizes the efficiency of utilization of propellant. Also, the size of the flow of electrons and ions can be similarly adjusted, such that the thrust generated by the engines can be adjusted easily and accurately. Another advantage is simplicity, because the conversion of electric energy into electric fields can be simply accomplished with metal electrodes that have specific shapes. However, there are disadvantages with ion engines. In particular, the accelerated ions might come in direct contact with the material of the electrodes and cause damage to the electrodes. And the negative electrons that leave the cathode and impinge on the anode also can cause damage to those electrodes. Generally, electrodes in ion engines have limited lifetime due to such wear.

Plasma engines are advantageous because they are not subject to the same wear mechanism as ion engines. But they are more complex because of the need to convert electric energy into plasma heating, and because the random motion of heated plasma particles, as they escape, means that not all particles have the optimal velocity of expulsion.

It would be desirable to have a type of electric spacecraft engine that combines the advantageous features of plasma engines and ion engines.

SUMMARY OF THE INVENTION

Embodiments of the present invention provide advantages of plasma engines in combination with advantages of ion engines. They do so by combining features of both engines and by employing an altogether different technique for accelerating plasma particles. In particular, electric spacecraft engines in accordance with the present invention accelerate plasma particles by means of one or more laser beams.

The parameters of the interaction between a laser beam and plasma particles are adjusted such that energy is transferred from laser light to plasma particles predominantly through the ponderomotive force. Such a force acts almost exclusively on the electrons in the plasma, and it results in the electrons being accelerated in a direction predominantly perpendicular to the direction of propagation of the beam. In contrast, the ions in the plasma are much less sensitive to the ponderomotive force than the electrons, and they undergo only a negligible amount of acceleration.

In embodiments of the present invention, the vessel containing the plasma has one or more outlets for letting some of the plasma particles escape. By appropriately positioning the laser beam relative to the outlets, the electrons accelerated by the ponderomotive force move preferentially toward one or more of the outlets. This is in contrast to prior-art plasma engines which just heat the plasma. Compared to plasma heating, the ponderomotive force, as generated in embodiments of the present invention, does not accelerate all plasma particles equally, and not in random directions; instead, it accelerates electrons almost exclusively, and the electrons are accelerated in a direction predominantly perpendicular to the direction of propagation of the laser beam.

Embodiments of the present invention also comprise electrodes for generating electric fields. Such electrodes are positioned near the outlets, and are arranged such that they generate electric fields that affect the flow of plasma particles. In particular, when a voltage is applied to the electrodes, the resulting electric field constitutes a barrier to the flow of plasma particles, and the height of the barrier can be adjusted by adjusting the voltage. As the electrons are accelerated by the ponderomotive force, they acquire increasingly greater kinetic energy until they become able to overcome the barrier and flow through one or more of the outlets. In contrast, the ions, which are largely unaffected by the ponderomotive force, remain inside the vessel containing the plasma.

In prior-art ion engines, the positive ions in the plasma are accelerated by a negatively-charged cathode. In embodiments of the present invention, the positive ions are accelerated by a virtual cathode. In particular, electrons, of course, are negatively charged. Therefore, as the electrons flow through the outlets and start accumulating outside of the vessel, they form a negative space charge that occupies a volume of space outside the outlets. This negative space charge behaves like the negatively-charged cathode in prior-art ion engines, and attracts the positive ions in the plasma. This attraction causes the ions to accelerate in the direction of the space charge, such that they, too, escape the plasma vessel through one or more outlets and are accelerated in the direction of the space charge.

Upon reaching the electron space charge, the positive ions recombine with the electrons, thus forming the expelled propellant.

In embodiments of the present invention, the arrangement of electrodes near the outlets is such that the resulting electric fields favor the flow of negatively-charged electrons through some outlets, or favor the flow of positively-charged ions through other outlets. The outlets can be positioned, relative to the laser beam, such that the flow of electrons and ions through the respective outlets is further enhanced.

DETAILED DESCRIPTION

Figure 1:
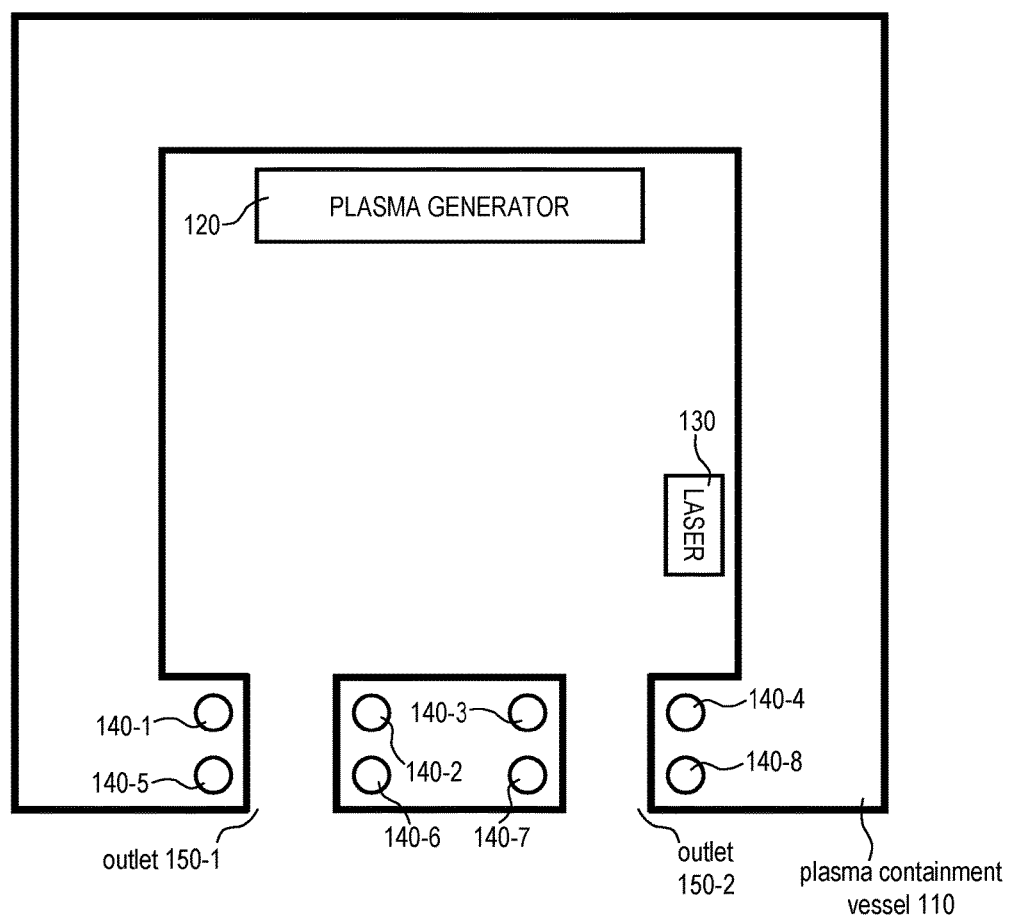
FIG. 1 is a diagram that illustrates the structure of a hybrid electric spacecraft engine in accordance with an illustrative embodiment of the present invention.

FIG. 1 is a diagram that illustrates the structure of hybrid electric spacecraft engine 100 in accordance with an illustrative embodiment of the present invention. Hybrid electric spacecraft engine 100 comprises plasma containment vessel 110, plasma generator 120, laser 130 and electrodes 140-1 through 140-8, interrelated as shown.

Plasma generator 120 is a device for generating a plasma. It is well-known in the art how to make such a device. For example, such a device might comprise a spark generator for generating an electric spark across the face of a solid surface. The heat of the spark causes some of the solid material to vaporize, and then the mobile electrons of the spark ionize the particles of the vaporized material. Such ionization results in the vaporized material becoming a plasma comprised of free electrons and free positive ions. For example, the solid material might be made of carbon, in which case the positive ions are carbon atoms that have lost one electron. The mass of one such positive ion is, as is well known in the art, approximately 22,000 times as much as the mass of one electron; but the positive ion has an electric charge that is the same as the charge of one electron, with the opposite sign.

Plasma containment vessel 110 is a vessel for confining the plasma generated by plasma generator 120 to a finite volume of space. It is well known in the art how to make such a containment vessel. For example, plasma containment vessel might be made of acrylic material. In the illustrative embodiment of the present invention represented in FIG. 1, plasma containment vessel 110 is made of such material. It will be clear to those skilled in the art, after reading this disclosure, how to make and use plasma containment vessels made of other materials. For example, a class of plasma containment vessels well-known in the art is made not out of ordinary matter, but rather out of magnetic fields. Such vessels take advantage of the fact that a plasma is a collection of charged particles whose movements are affected by electric and magnetic fields. Of course, such a magnetic vessel requires magnets or magnetic coils made out of ordinary matter for generating the magnetic fields. For example, superconducting coils might be used for such purpose.

Outlets 150-1 and 150-2 are openings in one of the walls of plasma containment vessel 110. They are for allowing some of the plasma particles to escape and, thereby, provide propulsion, as explained in greater detail in the coming paragraphs.

In this illustrative embodiment of the present invention, electrodes 140-1 through 140-8 are wires that are embedded in the wall of plasma containment vessel 110; they are placed in the vicinity of openings 150-1 and 150-2 for the purpose of generating electric fields in and around the openings. They are shown in cross section in FIG. 1.

Figure 2:
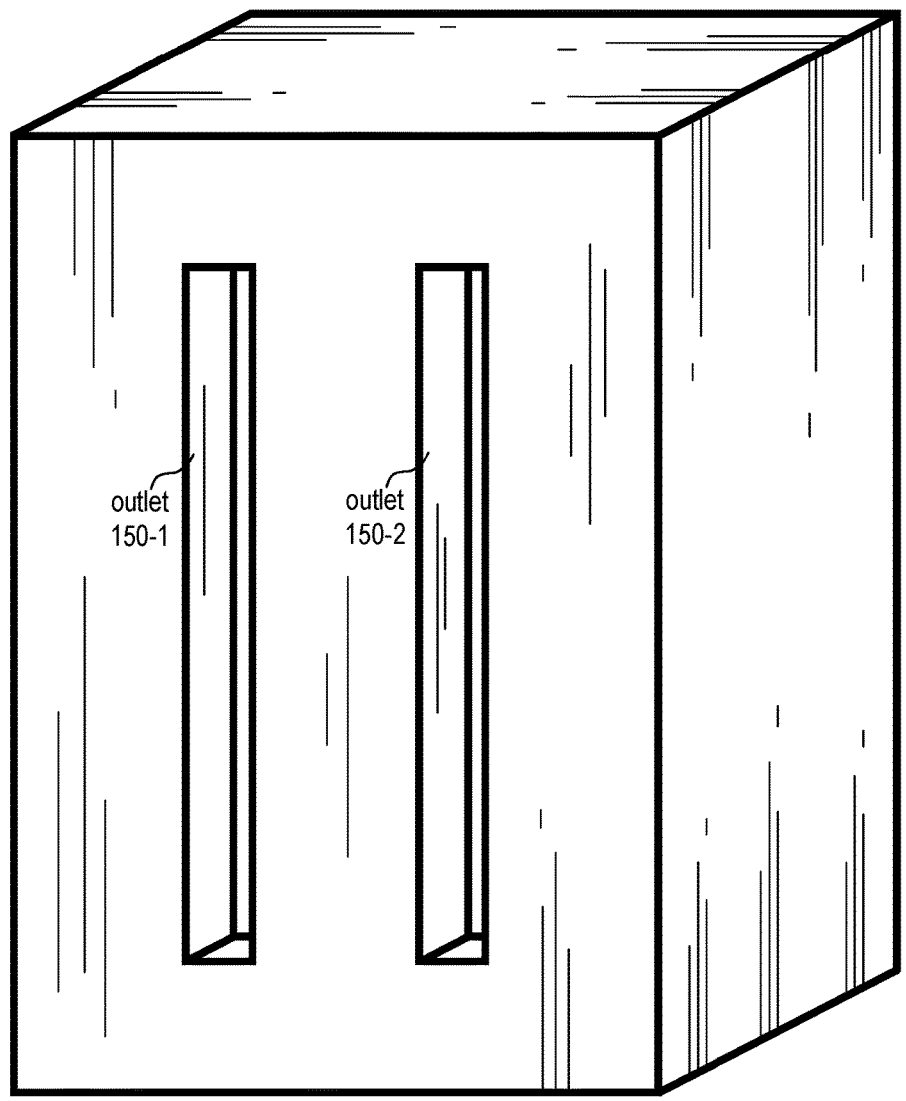
FIG. 2 depicts a perspective view of a plasma containment vessel.

FIG. 2 depicts a perspective view of plasma containment vessel 110, as viewed from the outside. The two outlets 150-1 and 150-2 are visible as openings in the front wall of the vessel, as depicted in the figure. In this depiction, the wires of electrodes 140-1 through 140-8 are not visible because they are embedded in the acrylic material of which the vessel is made, but they run vertically, as depicted in the figure, along the two openings.

It is an important advantage of the present invention that the electrodes are entirely embedded in the acrylic material, such that they never come in contact with plasma particles. Therefore, in contrast with ion engines, there is no electric current flowing through electrodes 140-1 through 140-8, and they do not experience any damage due to interactions with plasma particles.

Figure 3:
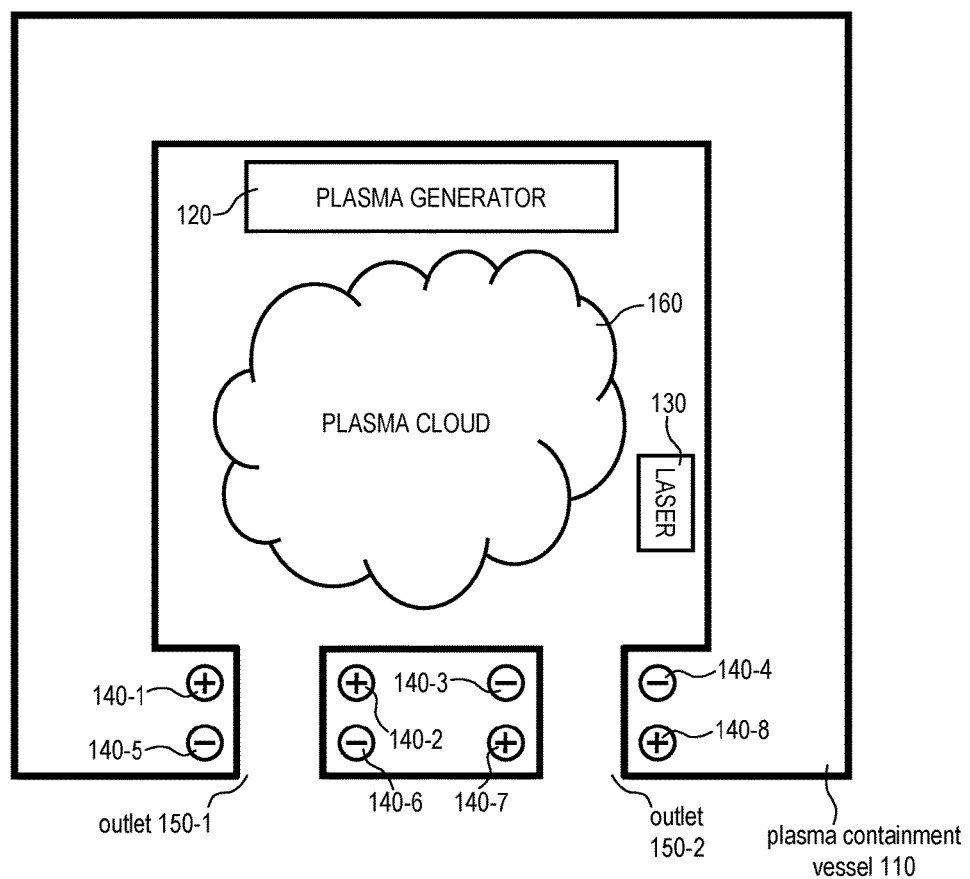
FIG. 3 is a diagram that illustrates what happens when a plasma generator is activated in a hybrid electric spacecraft engine in accordance with an illustrative embodiment of the present invention.

FIG. 3 is a diagram that illustrates what happens when plasma generator 120 is activated. It is a feature of the present invention that plasma generator 120 is not continuously active. Instead, the plasma generator is activated for a short period of time in order to generate a cloud of plasma, depicted in FIG. 3 as plasma cloud 160, inside plasma containment vessel 110. In embodiments of the present invention, plasma generator 120 provides enough energy to ionize the plasma, but not much more than that.

FIG. 3 also shows that, prior to activating the plasma generator, a voltage is applied to electrodes 140-1 through 140-8. In particular, electrodes 140-1, 140-2, 140-7, and 140-8 are connected to the positive terminal of a constant-voltage generator, and electrodes 140-3 through 140-6 are connected to the negative terminal of the constant-voltage generator. Such connections are indicated in the figure by "+" or "−" symbols inside the circles that represent the electrodes.

The constant-voltage generator is not shown explicitly in FIG. 3. It is well known in the art how to make a constant-voltage generator. For example, such a generator might be a direct-current (DC) power supply that generates a suitable voltage. As already mentioned, it is a feature of the present invention that, nominally, no current flows through electrodes 140-1 through 140-8, such that, nominally, the voltage generator does not have to provide any power, just a fixed voltage. In practice, the acrylic material is not a perfect insulator, and some small leakage current is likely to be present. Therefore, the DC power supply needs to be kept turned on during normal operation in order to keep the electrodes continually polarized; however, the amount of energy that the DC power supply must deliver is very small, just enough for counteracting the leakage current.

The voltage applied to electrodes 140-1 through 140-8 results in the creation of electric fields in the volume of space inside outlets 150-1 and 150-2. Such electric fields are a barrier to the flow of plasma particles, such that the plasma, as generated by the plasma generator, remains inside the containment vessel. This is so because, as noted above, the plasma generator provides only enough energy to ionize the plasma, but not much beyond that. As a result, the kinetic energy of plasma particles is not sufficient for them to overcome the barriers presented by the electric fields in the two outlets.

After plasma generator 120 has generated plasma cloud 160 inside plasma containment vessel 110, laser light is used to accelerate plasma particles. In particular, laser 130 is activated to generate a laser beam.

Figure 4:
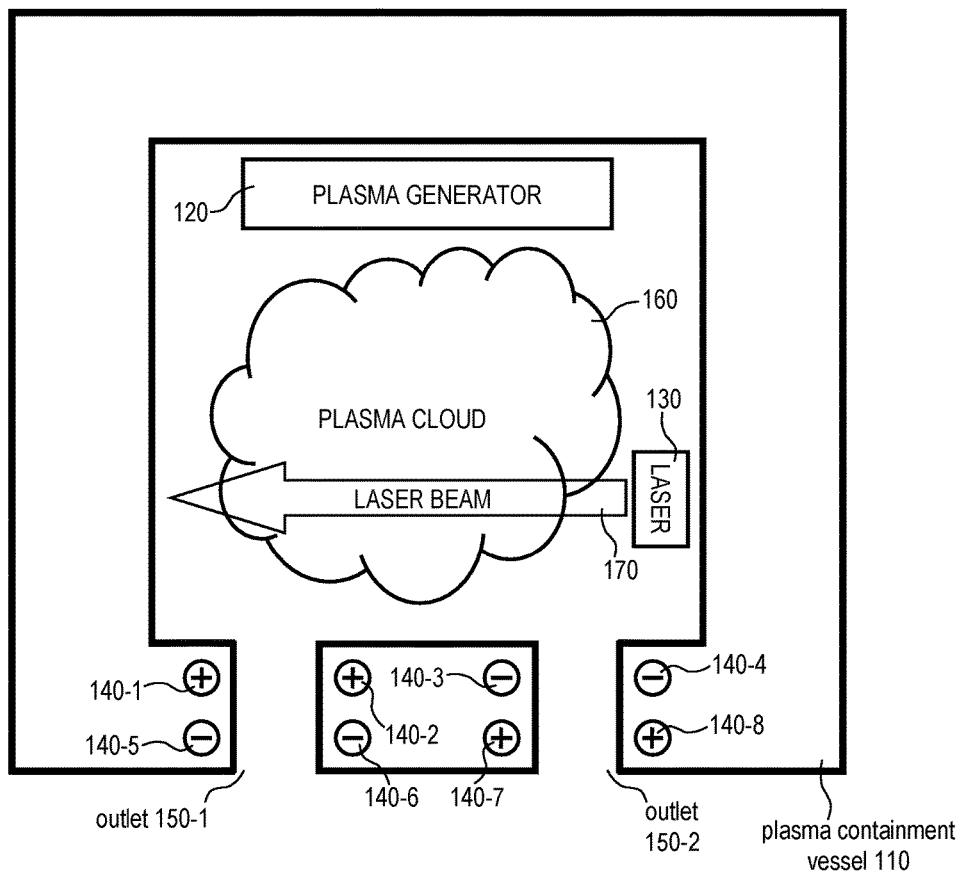
FIG. 4 depicts a hybrid electric spacecraft engine with a laser beam illuminating a plasma cloud.

FIG. 4 depicts hybrid electric spacecraft engine 100 with the laser beam illuminating the plasma cloud. The laser beam is depicted as laser beam 170. The laser beam illuminates a portion of the plasma cloud, such that the plasma particles that are in the path of the beam experience a ponderomotive force.

In physics, the ponderomotive force is defined as the force that a charged particle experiences in an inhomogeneous oscillating electric field such as the electric field present in a laser beam. In particular, as the laser light propagates in the laser beam, there is a strong oscillating electric field in the center of the beam. A plasma particle located at or near the center of the beam experiences this oscillating field; however, the amplitude of the field vanishes if the particle is moved outside of the beam. This decrease in amplitude is an inhomogeneity of the oscillating electric field, and, therefore, plasma particles that are inside the laser beam experience a ponderomotive force that accelerates them in a direction perpendicular to the direction of propagation of the beam.

The formula for the ponderomotive force is $$F = -\frac{e^2}{4m\omega^2}\nabla E^2$$

wherein F is the strength of the ponderomotive force; e and m are, respectively, the charge and the mass of the charged particle; ω is the angular frequency of the oscillating field, and E is the peak amplitude of the oscillating electric field. It is important to note that the mass of the charged particle appears in the denominator. Therefore, in a plasma wherein electrons are much lighter than positive ions, the effects of the ponderomotive force are felt much more strongly by the electrons than by the positive ions. For example, if the positive ions are carbon ions, the energy acquired by the electrons because of the ponderomotive force is about 22,000 times as much as the energy acquired by the ions.

In this illustrative embodiment of the present invention, the laser is a pulsed laser; i.e., it is a laser that emits light as a sequence of short periodic pulses. Each pulse acts on the electrons in the plasma through the ponderomotive force, with negligible effects on the positive ions because of their larger mass. Each pulse accelerates the electrons in a direction perpendicular to the direction of propagation of the beam and this acceleration results in an increased kinetic energy of the electrons.

As the kinetic energy of the electrons increases after each laser pulse, at some point they will have acquired enough kinetic energy to overcome the barrier presented by the electric fields in outlets 150-1 and 150-2. In particular the polarity of the electric fields in outlet 150-2 is such that the electrons need less kinetic energy to overcome it, and, therefore, they will start flowing through that outlet as soon as their kinetic energy is large enough.

Figure 5:
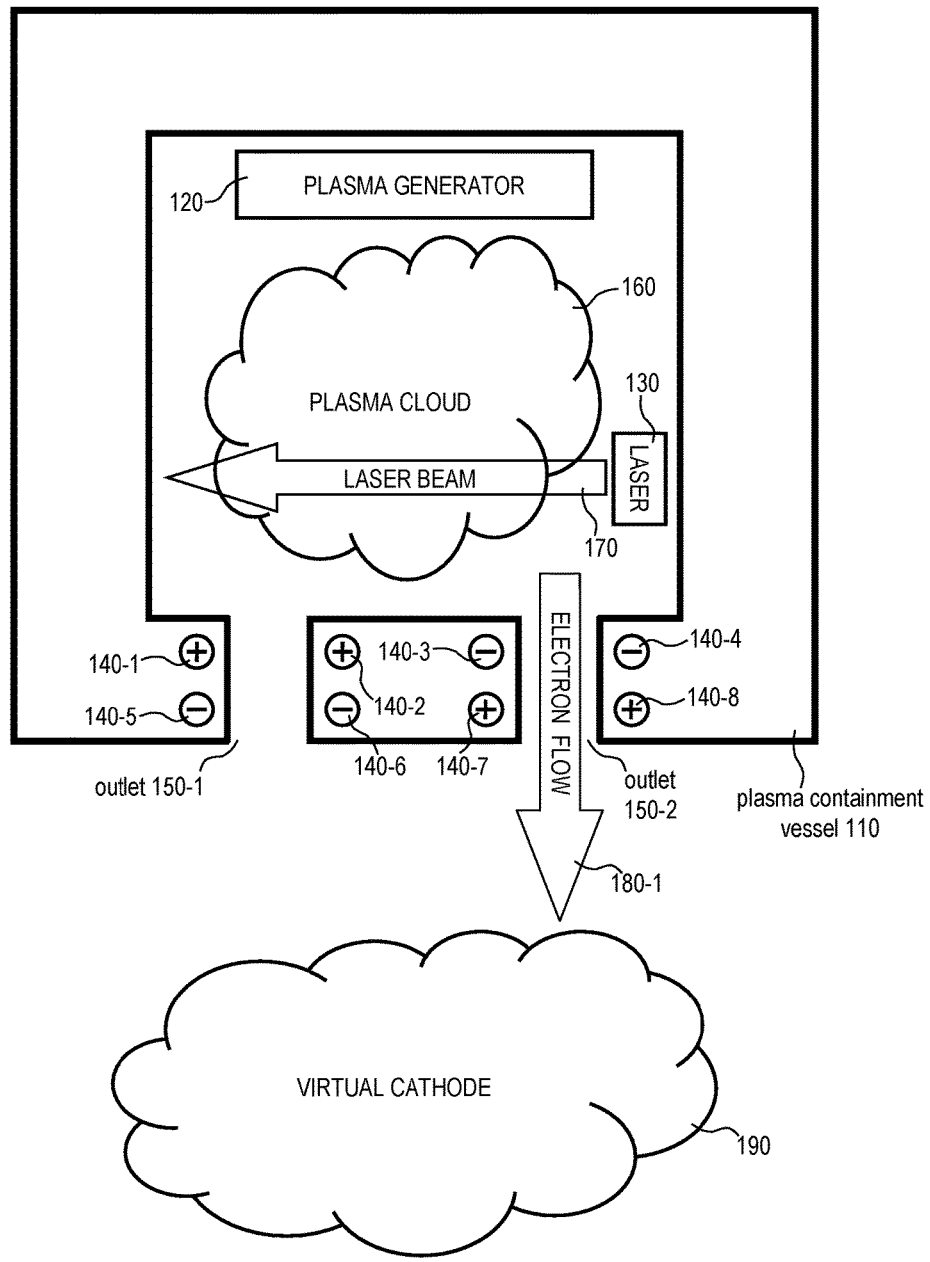
FIG. 5 depicts a hybrid electric spacecraft engine with electrons escaping out of a plasma containment vessel through an outlet.

FIG. 5 depicts hybrid electric spacecraft engine 100 with electrons escaping out of the plasma containment vessel through outlet 150-2. The escaping electrons are depicted as electron flow 180-1.

Outlet 150-2 opens into outer space, such that the electrons that escape through the outlet leave the spacecraft entirely. However, electrons are negatively charged, while the positive ions that are left behind are, of course, positively charged. As more and more electrons leave the spacecraft, the spacecraft acquires a positive charge because of the positive ions left behind. Therefore, the negative electrons are attracted back toward the spacecraft, and never get too far from it.

As more and more electrons accumulate outside the spacecraft, in the volume of space just outside the two outlets 150-1 and 150-2, they form a negatively-charged cloud referred to as a "space charge".

The presence of the negative space charge on the outside of the containment vessel and in front of the outlets, together with the cloud of positively charged ions that were left behind in the containment vessel, on the other side of the outlets, alters the shape of the electric field in outlet 150-1; and the attraction of the positive ions by the negative space charge pushes the ions in the direction of the outlet with enough kinetic energy to overcome the barrier in that outlet.

Much like the polarity of the electric fields in outlet 150-2 favored the flow of electrons, the polarity of the electric fields in outlet 150-1 favors the flow of positive ions, such that, when the space charge has accumulated enough electrons, positive ions start flowing through outlet 150-1 while being accelerated by the electric fields in the outlet.

Like outlet 150-2, outlet 150-1 also opens into outer space, in the same direction as outlet 150-2. Therefore, the positive ions that are accelerated by the electric fields in outlet 150-1 escape into the same volume of outer space where the space charge is present. There, they recombine with the electrons, and, due to the kinetic energy that they have acquired, they continue moving away from the spacecraft without carrying any electric charge.

The electron space charge in this illustrative embodiment of the present invention behaves similarly to the cathode of an ion engine. Therefore, it is referred to as a "virtual cathode" and is depicted in FIG. 5 as virtual cathode 190. However, in contrast to an ion engine where the cathode is made out of an electrically conductive material, the space charge is not damaged by the flow of electrons and positive ions.

Figure 6:
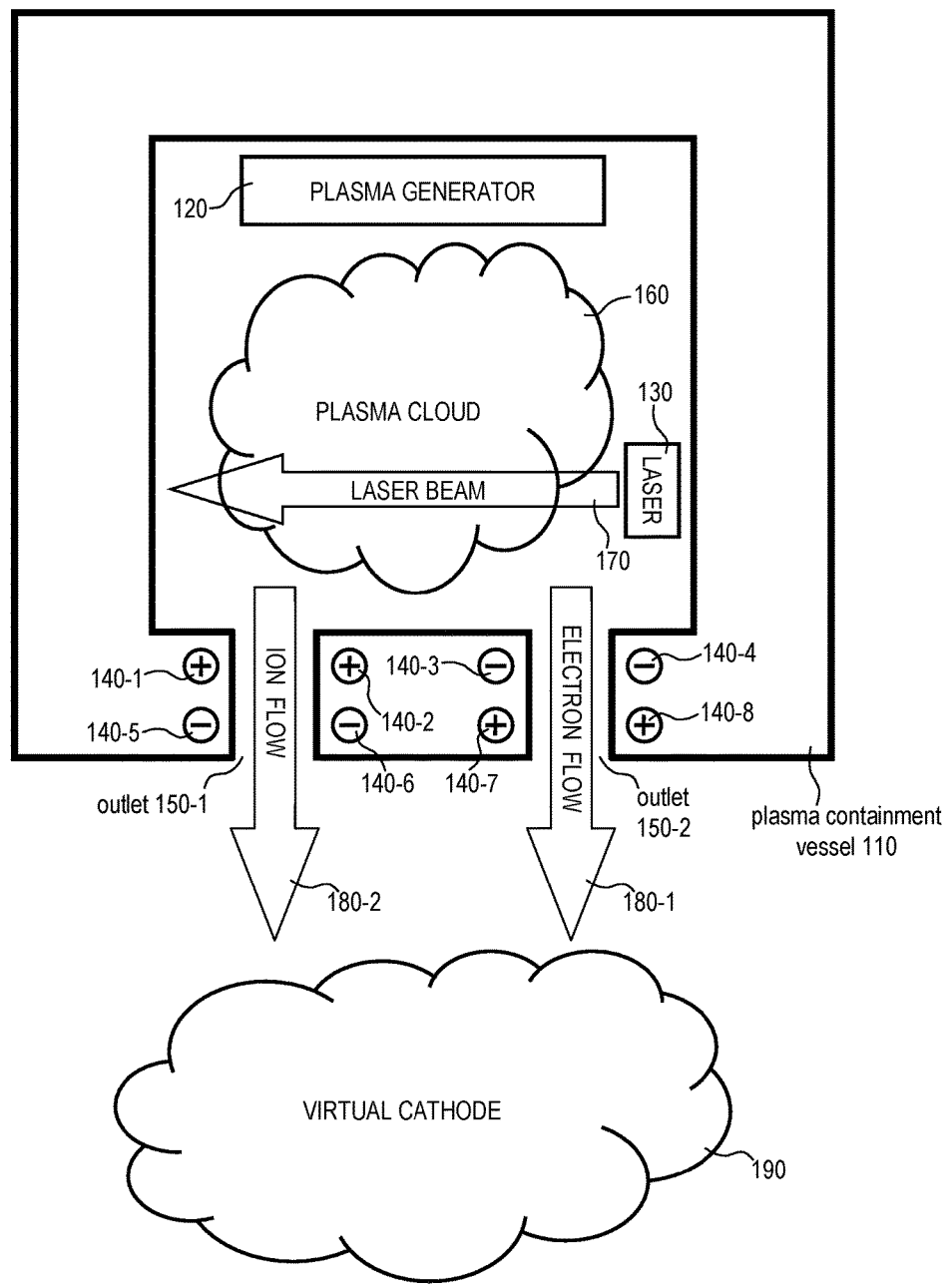
FIG. 6 depicts a hybrid electric spacecraft engine with electrons and ions escaping out of a plasma containment vessel through two outlets.

FIG. 6 depicts hybrid electric spacecraft engine 100 with electrons and ions escaping out of the plasma containment vessel through outlets 150-1 and 150-2. The escaping ions are depicted as ion flow 180-2. The figure shows that the escaping ions meet the electrons in the space charge, where they recombine and, by virtue of their kinetic energy, continue moving away from the spacecraft, thereby generating thrust through the principle of conservation of momentum. After allowing enough time for a substantial number of positive ions to escape, the process is repeated starting with activation of the plasma generator, as shown in FIG. 3.

Figure 7:
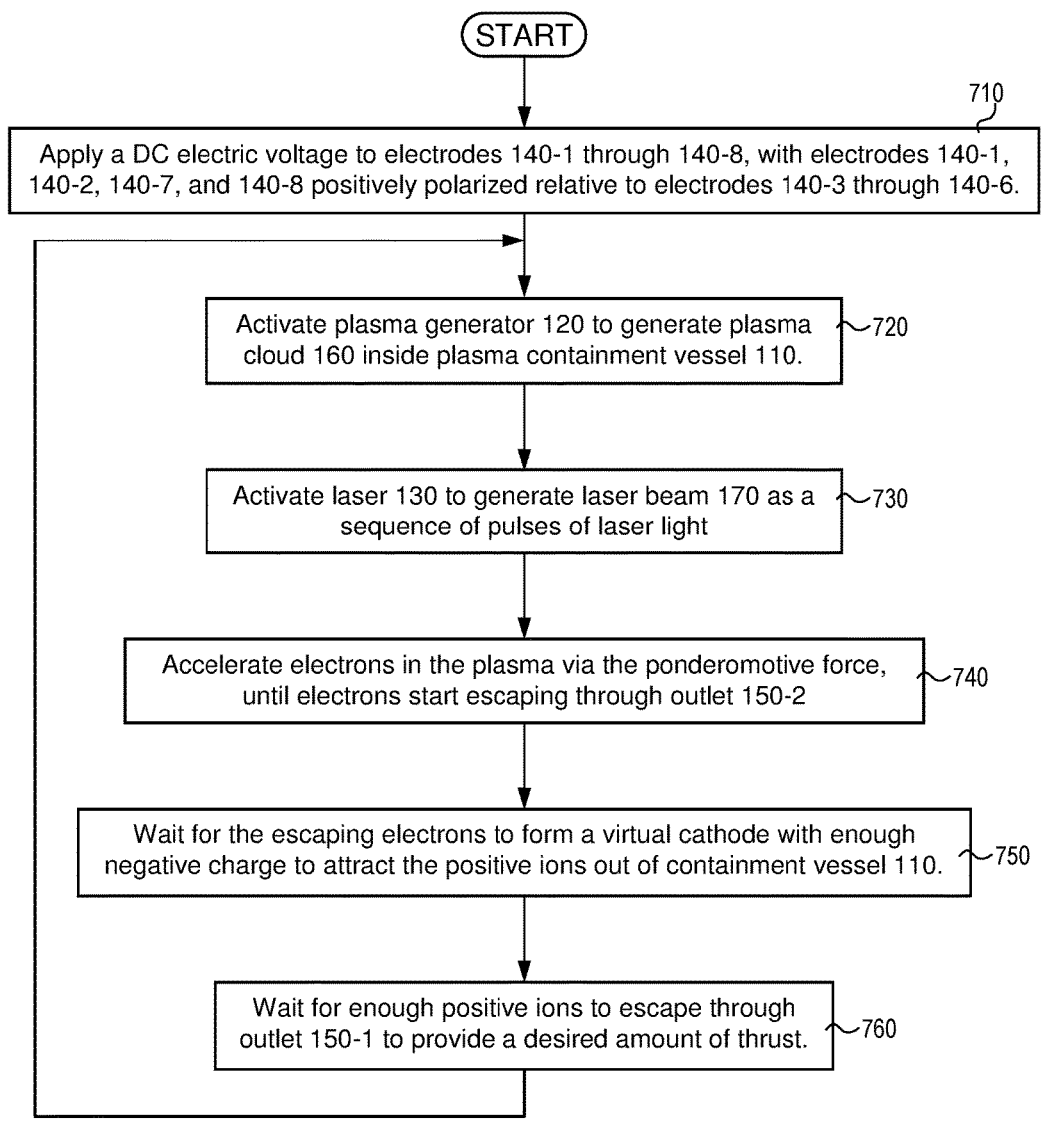
FIG. 7 a flow diagram of a method for generating thrust via a hybrid electric spacecraft engine.

FIG. 7 is a flow diagram of a method 700 comprising the salient operations of the process to generate thrust via this illustrative embodiment of the present invention. The figure outlines a number of operations and resultant effects that are interrelated as shown. The hybrid engine in this illustrative embodiment of the present invention executes the outlined operations and directly causes the indicated effects as a result of the recited operations. One or more components of the engine execute one or more of the recited operations, as discussed in more detail above.

In regard to method 700, it will be clear to those having ordinary skill in the art, after reading the present disclosure, how to make and use alternative embodiments of method 700 wherein the recited operations are differently sequenced, grouped, or sub-divided—all within the scope of the present invention. It will be further clear to those skilled in the art, after reading the present disclosure, how to make and use alternative embodiments of method 700 wherein some of the recited operations are optional, are omitted, or are executed by other elements and/or systems associated with the engine; e.g., by elements that are external to and interconnected with the ion engine.

Figure 8:
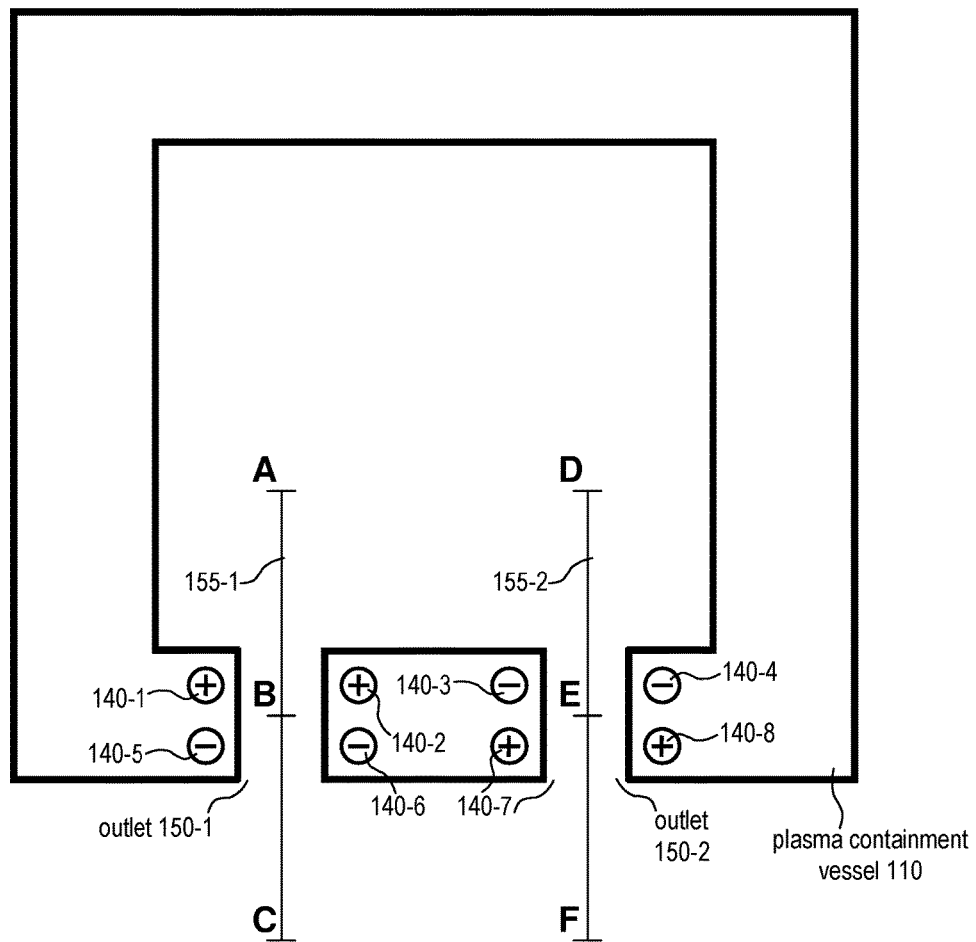
FIG. 8 shows two possible paths that plasma particles might follow when escaping from a plasma containment vessel.

FIG. 8 shows two possible paths that plasma particles might follow when escaping from plasma containment vessel 110 through outlets 150-1 and 150-2. In particular, path 155-1 goes from point A to point B to point C, while path 155-2 goes from point D to point E to point F.

Figure 9A:
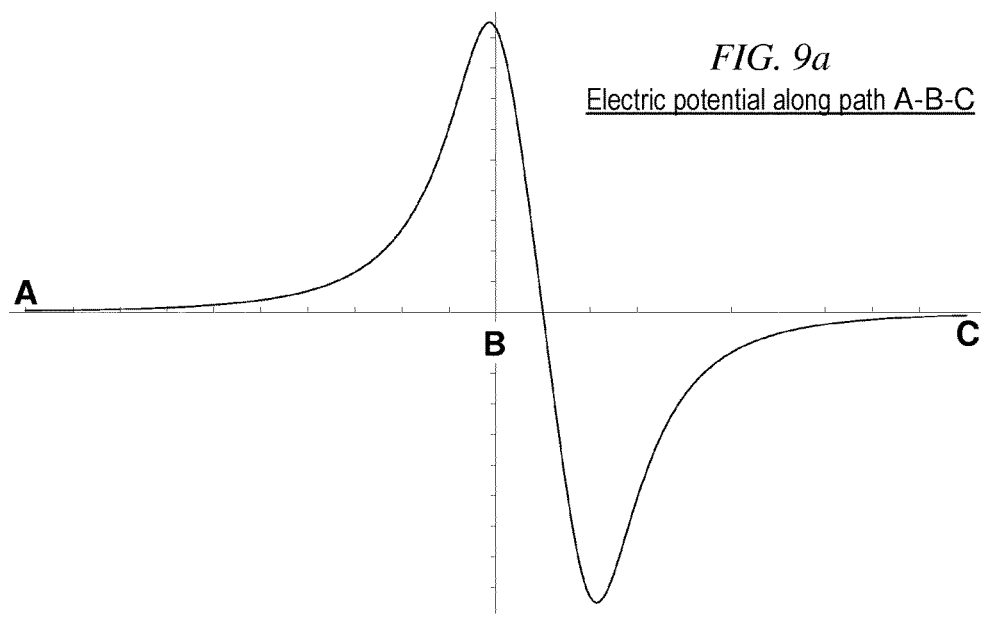
FIG. 9a is a graph that shows the electrical potential along a path for particles escaping from a plasma containment vessel.

FIG. 9a is a graph that shows the electrical potential along path 155-1 from point A, through point B, to point C. In agreement with the polarity shown in FIGS. 3-6, and 8 for electrodes 140-1, 140-2, 140-5, and 140-6, the electric potential first increases and passes through a positive peak, going from A to B, and then decreases and passes through a negative peak, going from B to C. This profile favors the flow of positive ions over negative electrons, as already remarked. The height of the peaks is in proportion to the voltage provided by the constant-voltage generator. The strength of the electric fields associated with the electric potential shown in the figure is in proportion to the height of the peaks and, therefore, the effectiveness of the electric fields as a barrier to the flow of plasma ions can be adjusted as needed by adjusting the voltage provided by the constant-voltage generator.

This is an important feature of the present invention, as the ability to adjust the height of the barrier independently of the kinetic energy delivered to the plasma particles, provides additional flexibility in adjusting the thrust generated by the engine.

Figure 9B:
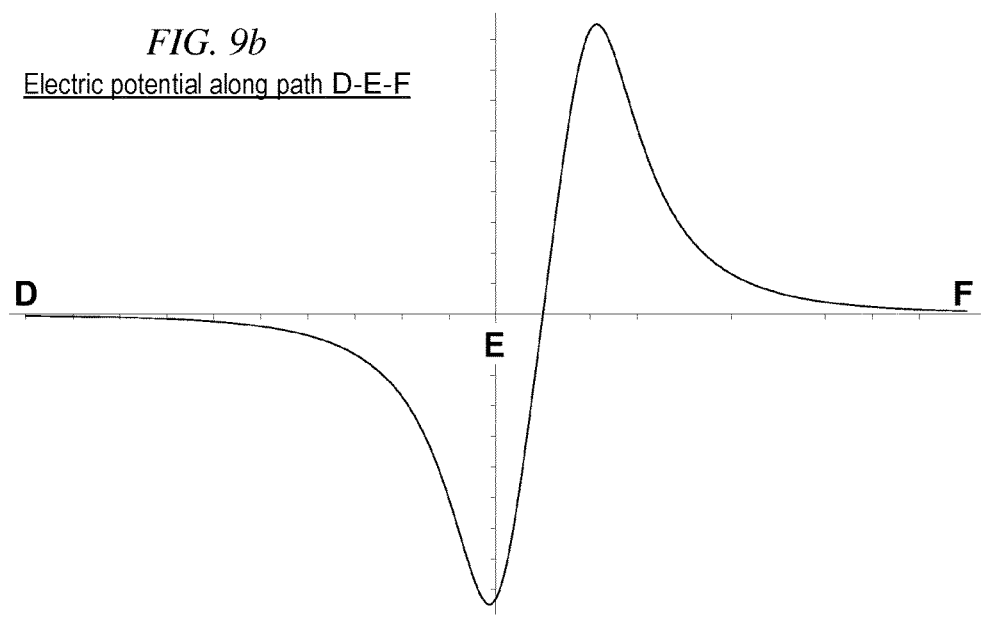
FIG. 9b is a graph that shows the electrical potential along a path for particles escaping from a plasma containment vessel.

FIG. 9b is a graph that shows the electrical potential along path 155-2 from point D, through point E, to point F. In agreement with the polarity shown in FIGS. 3-6, and 8 for electrodes 140-3, 140-4, 140-7, and 140-8, the electric potential first decreases and passes through a negative peak, going from D to E, and then increases and passes through a positive peak, going from E to F. This profile favors the flow of negative electrons over positive ions, as already remarked. Similarly to the comment made for FIG. 9a, the height of the peaks is in proportion to the voltage provided by the constant-voltage and the effectiveness of the electric fields as a barrier to the flow of plasma electrons can be adjusted as needed by adjusting the voltage provided by the constant-voltage generator.

FIGS. 3-6 show one laser 130 for generating laser beam 170. In some embodiment of the present invention, it is advantageous to use two or more lasers. A second laser can be arranged to generate a second laser beam that propagates in a direction parallel to the direction of laser beam 170, but in the opposite direction. Such a second laser beam is advantageous because second-order effects in the interaction between laser beam 170 and plasma electrons might accelerate the electrons in the direction of the laser beam. Such effects are likely to be small, compared to the predominant effect of the ponderomotive force which, as noted above, accelerates the electrons in a direction perpendicular to the direction of propagation of the laser beam. However, in embodiments wherein such second-order effects are undesirable, a second laser arranged as described above can reduce such effects.

A second laser is most effective if it generates a laser beam that propagates near laser beam 170. In particular, it is advantageous if the distance between the two laser beams is, at most, five times the diameter of the larger of the two beams.

An important advantage of the present invention over the prior art is that electrons in the plasma are accelerated preferentially over the positive ions, and in a non-random fashion. This is in contrast to the prior-art technique of accelerating all plasma particles by heating the plasma. As noted above, the effect of the ponderomotive force is to accelerate plasma electrons in a direction that is perpendicular to the direction of propagation of the laser beam. Such directionality means that, by judiciously positioning the laser beam relative to outlets 150-1 and 150-2, it is possible to enhance the proportion of electrons and positive ions that flow through the outlets. The shapes of the two outlets and the position of the laser beam shown in FIGS. 4-6 have been determined to be advantageous through computer simulations. However, it will be clear to those skilled in the art, after reading this disclosure, how to make and use embodiments of the present invention with other advantageous shapes for any number of outlets and with any number of laser beams advantageously positioned, relative to the outlets, to take advantage of the directionality of the ponderomotive force.

It is to be understood that this disclosure teaches just one or more examples of one or more illustrative embodiments, and that many variations of the invention can easily be devised by those skilled in the art after reading this disclosure, and that the scope of the present invention is defined by the claims accompanying this disclosure.

What is claimed is:

1. An apparatus for imparting thrust to a spacecraft, the apparatus comprising:
   a plasma generator for generating a plasma;
   a containment vessel for containing the plasma;
   a first laser for generating laser light in a first laser beam;
   a voltage source for generating an electric potential at a constant voltage; and
   an arrangement of electrodes connected to the voltage source for generating an electric field in response to the electric potential;
   wherein the containment vessel has one or more outlets for letting a first portion of plasma particles escape from the containment vessel;
   wherein the first laser is positioned, relative to the containment vessel, such that the first laser beam illuminates a second portion of plasma particles;
   wherein particles in the second portion of plasma particles are pushed in a direction away from a radial center of the first laser beam by a ponderomotive force caused by the laser light in the first laser beam;
   wherein operational parameters of the plasma generator, of the containment vessel, and of the first laser, are adjusted such that the ponderomotive force is the dominant force acting on the particles in the second portion of plasma particles; and
   wherein the one or more outlets are positioned, relative to the first laser, such that the ponderomotive force causes the particles in the second portion of plasma particles to move preferentially in a direction of at least one outlet of the one or more outlets, compared to particles that move in random directions, such that at least some of the particles in the second portion of plasma particles move into the first portion of plasma particles and escape from the containment vessel through at least one outlet of the one or more outlets;
   wherein the arrangement of electrodes is positioned, relative to the containment vessel, such that the electric field causes a barrier of electrostatic potential to be present in a path followed by particles in the first portion of plasma particles as the first portion of plasma particles escape from the containment vessel through at least one outlet of the one or more outlets.

2. The apparatus of claim 1 further comprising (vi) (iv) a second laser for generating laser light in a second laser beam;
   wherein the second laser is positioned such that the second laser beam propagates parallel to the first laser beam, but in an opposite direction.

3. The apparatus of claim 1 wherein the first laser is a pulsed laser, such that the laser light in the first laser beam comprises a plurality of pulses of laser light.

4. The apparatus of claim 1 wherein the particles in the first portion of plasma particles and the particles in the second portion of plasma particles are electrons;
   wherein the particles in the first portion of plasma particles, after escaping through the at least one outlet of the one or more outlets, form a virtual cathode outside the containment vessel; and
   wherein the virtual cathode generates a virtual cathode electric field that causes a third portion of plasma particles to escape from the at least one outlet of one or more outlets.

5. A method for imparting thrust to a spacecraft, the method comprising:
   (i) generating a plasma;
   (ii) containing the plasma in a confined volume of space;

(iii) providing one or more outlets for letting a first portion of plasma particles escape from the confined volume of space;

(iv) generating laser light in a first laser beam;

(v) generating an electric potential at a constant voltage; and (vi) supplying the electric potential to an arrangement of electrodes for generating an electric field in response to the electric potential:

wherein the first laser beam illuminates a second portion of plasma particles;

wherein particles in the second portion of plasma particles are pushed in a direction away from a radial center of the first laser beam by a ponderomotive force caused by the laser light in the first laser beam;

wherein the ponderomotive force is the dominant force acting on the particles in the second portion of plasma particles;

wherein the at least one outlet of the one or more outlets is positioned, relative to the first laser beam, such that the ponderomotive force causes the particles in the second portion of plasma particles to move preferentially in a direction of at least one outlet of the one or more outlets, compared to particles that move in random directions, such that at least some of the particles in the second portion of plasma particles move into the first portion of plasma particles and escape from the containment vessel through at least one outlet of the one or more outlets: and wherein the arrangement of electrodes is such that the electric field causes a barrier of electrostatic potential to be present in a path followed by particles in the first portion of plasma particles as the first portion of plasma particles escape from the containment vessel through the at least one outlet of the one or more outlets.

6. The method of claim 5 further comprising (v) (vii) generating laser light in a second laser beam;

wherein the second laser beam propagates in a direction parallel to the first laser beam, but in an opposite direction.

7. The method of claim 5 wherein the laser light in the first laser beam is generated as pulsed light, such that it the first laser beam comprises a plurality of pulses of laser light.

8. The method of claim 5 wherein the particles in the first portion of plasma particles and the particles in the second portion of plasma particles are electrons;

wherein the particles in the first portion of plasma particles, after escaping through at least one outlet of the one or more outlets, form a virtual cathode outside the confined volume of space; and wherein the virtual cathode generates a virtual cathode electric field that causes plasma particles in a third portion of plasma particles to escape from the confined volume of space through at least one outlet of the one or more outlets.

9. An apparatus for imparting thrust to a spacecraft, the apparatus comprising:

(i) a plasma generator for generating a plasma;

(ii) a containment vessel for containing the plasma, wherein the containment vessel has one or more outlets for letting a first portion of plasma particles escape from the containment vessel;

(iii) a plasma-particle accelerator for increasing the kinetic energy of plasma particles in a second portion of plasma particles;

(iv) a voltage source for generating an electric potential at a constant voltage; and (v) an arrangement of electrodes connected to the voltage source for generating an electric field in response to the electric potential;

wherein the arrangement of electrodes is positioned, relative to the containment vessel, such that the electric field causes a barrier of electrostatic potential to be present in a the path followed by particles in the first portion of plasma particles as the first portion of plasma particles escape from the containment vessel through at least one outlet of the one or more outlets;

wherein the plasma-particle accelerator comprises a first laser for generating laser light in a first laser beam;

wherein the first laser is positioned, relative to the containment vessel, such that the first laser beam illuminates the second portion of plasma particles;

wherein particles in the second portion of plasma particles are pushed in a direction away from a radial center of the first laser beam by a ponderomotive force caused by the laser light in the first laser beam;

wherein operational parameters of the plasma generator, of the containment vessel, and of the first laser, are adjusted such that the ponderomotive force is the dominant force acting on the particles in the second portion of plasma particles; and wherein the one or more outlets are positioned, relative to the first laser, such that the ponderomotive force causes the particles in the second portion of plasma particles to move preferentially in a direction of at least one outlet of the one or more outlets, compared to particles that move in random directions, such that at least some of the particles in the second portion of plasma particles move into the first portion of plasma particles and escape from the containment vessel through at least one outlet of the one or more outlets.

10. The apparatus of claim 9, wherein the plasma-particle accelerator further comprises a second laser for generating laser light in a second laser beam;

wherein the second laser is positioned such that the second laser beam propagates parallel to the first laser beam, but in an opposite direction.

11. The apparatus of claim 9 wherein the first laser is a pulsed laser, such that the laser light in the first laser beam comprises a plurality of pulses of laser light.

12. The apparatus of claim 9 wherein the particles in the first portion of plasma particles and the particles in the second portion of plasma particles are electrons;

wherein the particles in the first portion of plasma particles, after escaping through the at least one outlet of the one or more outlets, form a virtual cathode outside the confined volume of space; and wherein the virtual cathode generates virtual cathode electric field that causes plasma particles in a third portion of plasma particles to escape from the confined volume of space through at least one outlet of the one or more outlets.

13. A method for imparting thrust to a spacecraft, the method comprising:

(i) generating a plasma;

(ii) containing the plasma in a confined volume of space;

(iii) providing one or more outlets for letting a first portion of plasma particles escape from the confined volume of space;

(iv) accelerating particles in a second portion of plasma particles such that the kinetic energy of particles in the second portion of plasma particles is increased;

(v) generating an electric potential at a constant voltage; and (vi) supplying the electric potential to
an arrangement of electrodes for generating
an electric field in response to the electric potential;

wherein the arrangement of electrodes is positioned, relative to the containment vessel, such that the electric field causes a barrier of electrostatic potential to be present in a path followed by particles in the first portion of plasma particles as the first portion of plasma particles escape from the containment vessel through at least one outlet of the one or more outlets;

wherein accelerating plasma particles further comprises generating laser light in a first laser beam;

wherein the first laser beam illuminates second portion of plasma particles;

wherein the particles in the second portion of plasma particles are pushed in a direction away from a radial center of the first laser beam by a ponderomotive force caused by the laser light in the first laser beam;

wherein the ponderomotive force is the dominant force acting on the particles in the second portion of plasma particles; and wherein the one or more outlets are positioned, relative to the first laser beam, such that the ponderomotive force causes the particles in the second portion of plasma particles to move preferentially in a direction of at least one outlet of the one or more outlets, compared to particles that move in random directions, such that at least some of the particles in the second portion of plasma particles move into the first portion of plasma particles and escape from the containment vessel through at least one outlet of the one or more outlets.

14. The method of claim 13, further comprising generating laser light in a second laser beam;

wherein the second laser beam propagates parallel to first laser beam, but in an opposite direction.

15. The method of claim 13 wherein the laser light in the first laser beam is generated as pulsed light, such that the first laser beam comprises a plurality of pulses of laser light.

16. The method of claim 13 wherein the particles in the first portion of plasma particles and the particles in the second portion of plasma particles are electrons;

wherein the particles in the first portion of plasma particles, after escaping through the at least one outlet of the one or more outlets, forms a virtual cathode outside the confined volume of space; and wherein the virtual cathode generates a virtual cathode electric field that causes plasma particles in a third portion of plasma particles to escape from the confined volume of space through the at least one outlet of the one or more outlets.

* * * * *